United States Patent [19]

Fake et al.

[11] Patent Number: 5,521,753

[45] Date of Patent: May 28, 1996

[54] MULTI-STAGE FIBRE AMPLIFIER

[75] Inventors: Michael Fake, Essex; Andrew T. Harker, Suffolk, both of United Kingdom

[73] Assignee: Hewlett-Packard Company, Palo Alto, Calif.

[21] Appl. No.: 367,155

[22] PCT Filed: Aug. 20, 1993

[86] PCT No.: PCT/GB93/01771

§ 371 Date: Jan. 10, 1995

§ 102(e) Date: Jan. 10, 1995

[87] PCT Pub. No.: WO94/05061

PCT Pub. Date: Mar. 3, 1994

[30] Foreign Application Priority Data

Aug. 20, 1992 [GB] United Kingdom .................... 9217706

[51] Int. Cl.⁶ ........................................... H01S 3/00
[52] U.S. Cl. .............................................. 359/341
[58] Field of Search ................................ 342/341; 372/6; 385/24, 27, 142

[56] References Cited

U.S. PATENT DOCUMENTS

| | | | |
|---|---|---|---|
| 5,050,949 | 9/1991 | DiGiovanni et al. | 359/341 |
| 5,115,338 | 5/1992 | DiGiovanni et al. | 359/337 |
| 5,177,634 | 1/1993 | Way | 359/341 |
| 5,367,587 | 11/1994 | Mizuochi et al. | 385/27 |

*Primary Examiner*—Mark Hellner
*Attorney, Agent, or Firm*—Nixon & Vanderhye

[57] ABSTRACT

A multi-stage fiber amplifier includes attenuators located between co-pumped and counter-pumped stages. The attenuators prevent transmission of pump energy between the stages and the transmission of signal energy from later to earlier stages. The attenuators substantially separate the various stages whereby unwanted interaction is substantially reduced.

8 Claims, 2 Drawing Sheets

MULTI-STAGE FIBRE AMPLIFIER

BACKGROUND OF THE INVENTION

1. Field of the Invention

This invention relates to multi-stage fibre amplifiers which are used to amplify optical signals by means of laser action which occurs in the core of the fibre.

2. Related Art

It has long been recognised that fibre amplifiers are an attractive alternative for amplifying optical signals. For example fibre amplifiers have been proposed for use as booster amplifiers to increase the output power from a telecommunications optical transmitter or at a telecommunications repeater to amplify optical signals which have been attenuated by transmission through a first telecommunications link in order that said signal has sufficient power for onward transmission through a second telecommunications link. A fibre amplifier comprises a lasing species, e.g. a rare earth such as praseodymium (Pr), neodymium (Nd) or erbium (Er), which is located in the core of a fibre waveguide. The fibre is connected, usually by means of a wavelength division multiplexer (WDM), to a pump which is adapted to provide pump radiation which interacts with the lasing species to produce the inversion which is needed to support lasing activity. In some embodiments the WDM is connected at the input end of the fibre whereas other embodiments connect the WDM at the output end; i.e. both configurations are known.

The gain available from a single stage amplifier, i.e. as described above, is limited. This limitation is due to a variety of technical features and two important contributors will be identified. In the first place, the power available from a single pump is limited and this limits the lasing activity so that only limited gain can be achieved. In addition, it is difficult to stimulate a sufficient quantity of the lasing species if all the pump radiation is derived from a single source. It has been recognised, at least theoretically, that these limitations could be overcome by the use of a plurality of pumps each of which stimulates a different region of the lasing species. This configuration can be regarded as a plurality of fibre amplifier stages connected in series whereby the output of one amplifier stage forms the input to the next amplifier stage. It will be appreciated that a multi-stage amplifier makes the limitations mentioned above less restrictive on the composite structure. Because there is a plurality of pumps the total power is not limited by the performance of any one of the pumps. Furthermore each pump is only required to stimulate a portion of the lasing species so the problems of distributions are made less onerous.

Many embodiments employ only two stages of amplification and it has been found that the two stages often provide an adequate gain. A simple version of a two stage fibre amplifier takes the form of a single region of suitably doped ("active") fibre connected at both ends by WDM to two different pumps. In other words, the amplifier is pumped from both ends. The two pumps of such amplifiers are also referred to as a co-pump and a counter-pump.

Unfortunately, such co- and counter-pumped multistage amplifiers give rise to difficulties which arise from the interaction between signals in the various stages. It is an object of this invention to enhance the performance of multi-stage amplifiers employing co-pumping and counter-pumping together.

SUMMARY OF THE INVENTION

According to this invention in a multi-stage amplifier having at least one co-pumped and one counter-pumped stage, wavelength selective attenuators are located between co-pumped and counter-pumped stages. The attenuators are wavelength selective in that different transmission characteristics are required for the signal wavelength and for the pump wavelength. At the signal wavelength, the attenuator not only needs to be wavelength sensitive but it also needs to be direction sensitive. In particular the attenuator should have low (ideally no) attenuation for signals travelling in the forward direction of the amplifier. In the case of signals travelling in the opposite direction a high attenuation is needed. At the pump wavelength the attenuator should have high attenuation for signals travelling in both directions.

It is now convenient to comment on the requirements for the signal wavelengths. The purpose of the amplifier is to amplify signals at the signal wavelength and, therefore, signals which are received at the input end are transmitted, with amplification, to the output end. Clearly it is undesirable to attenuate these signals because this is contrary to the purpose of the device. However, attenuators are likely to be imperfect, and a small amount of attenuation at the signal wavelength in the forward direction may have to be tolerated. A small amount of attenuation is, however, acceptable because the signals are still amplified at a later stage and a small increase of gain compensates for the unwanted attenuation. However, it is possible to have energy at the signal wavelength which may attempt to propagate in the reverse direction. Such reverse signals can arise from spontaneous emission in the amplifiers or by reason of unintended reflected signals. Unfortunately, the fibre amplifiers are not directionally sensitive and, therefore, the signals transmitted in the reverse direction will be amplified and there is a substantial risk that noise will be created. This invention locates an attenuator between the stages and this attenuator is adapted to reduce the strength of the reverse direction signal whereby these problems are substantially reduced.

The considerations set out in the previous paragraph relate to the signal wavelength; different considerations apply at the pump wavelength. The pumps are usually semiconductor devices and they are associated with drive and control electrical circuitry. In a multi-stage amplifier employing co-pumping and counter-pumping it is possible for a pump providing energy for one of the stages to receive pump energy from the (or all of the) other amplifier stages. In this case the control circuitry can be confused by the pump wavelengths received from inappropriate amplifier stages. This invention locates an attenuator between co-pumped and counter-pumped stages of the amplifier, and each attenuator is adapted to reduce the intensity of pump radiation from whichever direction. This substantially reduces the risk that control circuitry will receive, and hence be confused by spurious pump energy.

It has been stated that each inter-stage attenuator has two functions and it is convenient to implement an attenuator as two separate devices each of which provides one of the functions. One of the devices is required to permit the passage of the signal wavelengths in the forward direction and to attenuate the signal wavelength in the opposite direction.

If this device also attenuates pump wavelengths this is not important (and it may even be regarded as an advantage). The other device is required to attenuate the pump wavelength in both directions. It is important that this device shall not cause substantial attenuation at the signal wavelength in the forward direction. The first device may be implemented as an optical isolator whereas the second device conveniently takes the form of a dichroic wavelength division multiplexer.

It has been stated above that the invention consists in the location of attenuators between the stages. It is, however, recommended that there should be no attenuators in the primary input and the final output circuits. In many implementations, the amplifiers are connected to long runs of transmission fibre, e.g. runs of up to 100 Km of transmission fibre. These long runs of fibre cause substantial attenuation at all wavelengths (and it is because of this substantial attenuation that fibre amplifiers are utilised in the first place). Since the multi-stage amplifiers are, in any case, connected to attenuating systems it is superfluous to incorporate extra attenuators. Furthermore, the input signal has low intensity (and the amplifier is installed primarily because the input signal has low intensity).

It may, therefore, be undesirable to include extra attenuation for what is already a weak signal. Similarly, in the output stage, unwanted attenuation may tend to reduce the range and, therefore, it is desirable to avoid the extra attenuation. These considerations recognise the fact that there may be a small amount of unwanted attenuation associated with the attenuators according to the invention. For reasons given above, this unwanted attenuation may not be important for an inter stage attenuator but it is usually desirable to avoid it in the input and output circuits.

BRIEF DESCRIPTION OF THE DRAWINGS

The invention will now be described by way of example with reference to the accompanying drawings wherein:

FIGS. 1 and 1A are a diagrammatic illustration of the preferred embodiment of the invention.

DETAILED DESCRIPTION OF EXEMPLARY EMBODIMENTS

Figure 1:
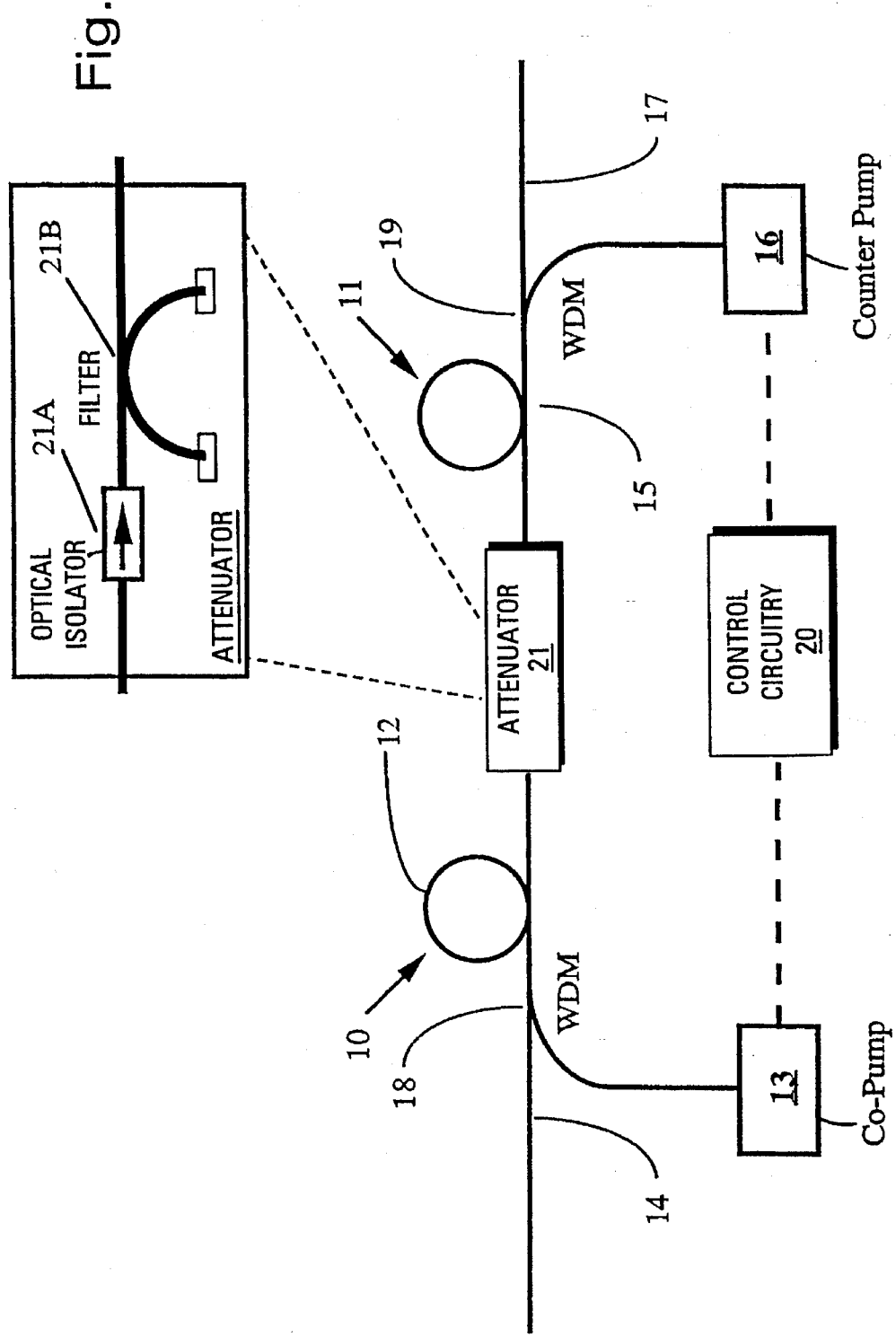

FIG. 1 illustrates a two-stage fibre amplifier having a first, co-pumped stage generally indicated by 10 and a second, counter-pumped stage generally indicated by 11. The first stage 10 includes a fibre amplifier 12 which contains erbium (Er) in its core as the lasing species. Fibre 12 has an input tail 14 which is adapted to serve as an input port for connection to a telecommunications link not shown in the drawing. Tail 14 enables the amplifier of FIG. 1 to receive optical signals for amplification in first stage 10. Fibre 12 is also connected, by a WDM 18, to co-pump 13 which provides pump energy to produce the inversions which are necessary for amplification by laser action in fibre 12.

The second stage 11 comprises a fibre tail 17 which is adapted for connection to a telecommunications link (not shown in the drawing) in order to provide amplified signals for onward transmission. Tail 17 is connected to fibre 15 via the WDM 19 which also contains erbium in its core to act as the lasing species. Fibre 15 is also connected via the WDM 19 to counter pump 16 which provides pump radiation into fibre 15 in order to maintain the inversion necessary for laser amplification.

Stages 10 and 11 are connected together by attenuator 21 so that signals amplified in fibre 12 are further amplified in fibre 15. As shown in greater detail in FIG. 1A, the attenuator 21 consists of an optical isolator 21A which is connected to precede, as shown in FIG. 1A, or follow, a filter 21B for selectively removing pump power. The filter shown is a dichroic WDM 21B.

The two stage amplifier illustrated in FIG. 1 also includes control circuitry 20 which is connected to co-pump 13 and counter pump 16. Both pumps have a front face which provides pump radiation into the amplifier but in addition each of the pumps 13 and 16 has a back face which may also emit pump radiation. The control circuitry 20 monitors the radiation emitted by the two back facets and this helps the control circuitry 20 to control the two pumps 13 and 16. This technique is usually called "Back Facet Monitoring". There is a difficulty in that pump radiation from counter-pump 16 could progress via WDM 19, fibre 15, fibre 12 and WDM 18 into co-pump 13 so that it is received at the back face. There is a similar possibility that pump radiation from co-pump 13 will reach the back face of counter-pump 16. It is apparent that this transmission creates the strong possibility that control circuitry 20 will be confused with the result that the performance of the two stage amplifier is considerably degraded. Attenuator 21 attenuates all pump radiation which attempts to pass between the two stages and, therefore, this possibility is considerably reduced whereby the control function and overall performance of the amplifier is substantially enhanced.

Attenuator 21 also reduces the strength of any signal wavelength which may attempt to propagate from fibre 15 into fibre 12. This backward transmission can arise from two different causes. One of the causes is spontaneous emission within the fibre 15 and it will be apparent that any spontaneous emission which attempts to transfer back to fibre 12 will be amplified in the two stages 10 and 11 and it is possible that spontaneous emission could cause oscillation or degrade the amplifier performance by reducing the population inversion in fibre 12. Attenuator 21 attenuates signal wavelengths propagating in the wrong direction so that this possibility is substantially reduced. A similar possibility of oscillation arises from the fact that signals may be reflected from fibre 15 back into fibre 12. Attenuator 21 also attenuates such reflected signals so that the possibility of oscillation is reduced.

The two-stage amplifier illustrated in FIG. 1 may be symmetrical in that each of the two stages have pumps of equal power and utilises amplifying fibres of substantially the same length (i.e. having the same amount of lasing species in each of the two stages). For example each of the two stages may contain about 20 meters of amplifying fibre. Alternatively the amplifier illustrated in FIG. 1 may be asymmetrical in that the two stages are different. Thus the second stage may comprise about 20 meters amplifying fibre whereas the first stage contains a shorter length of fibre, e.g. about 15 meters. Since the second stage 11 handles signals of higher power than the first stage 10 it may be convenient to provide more lasing potential in the second stage 11.

Figure 2:
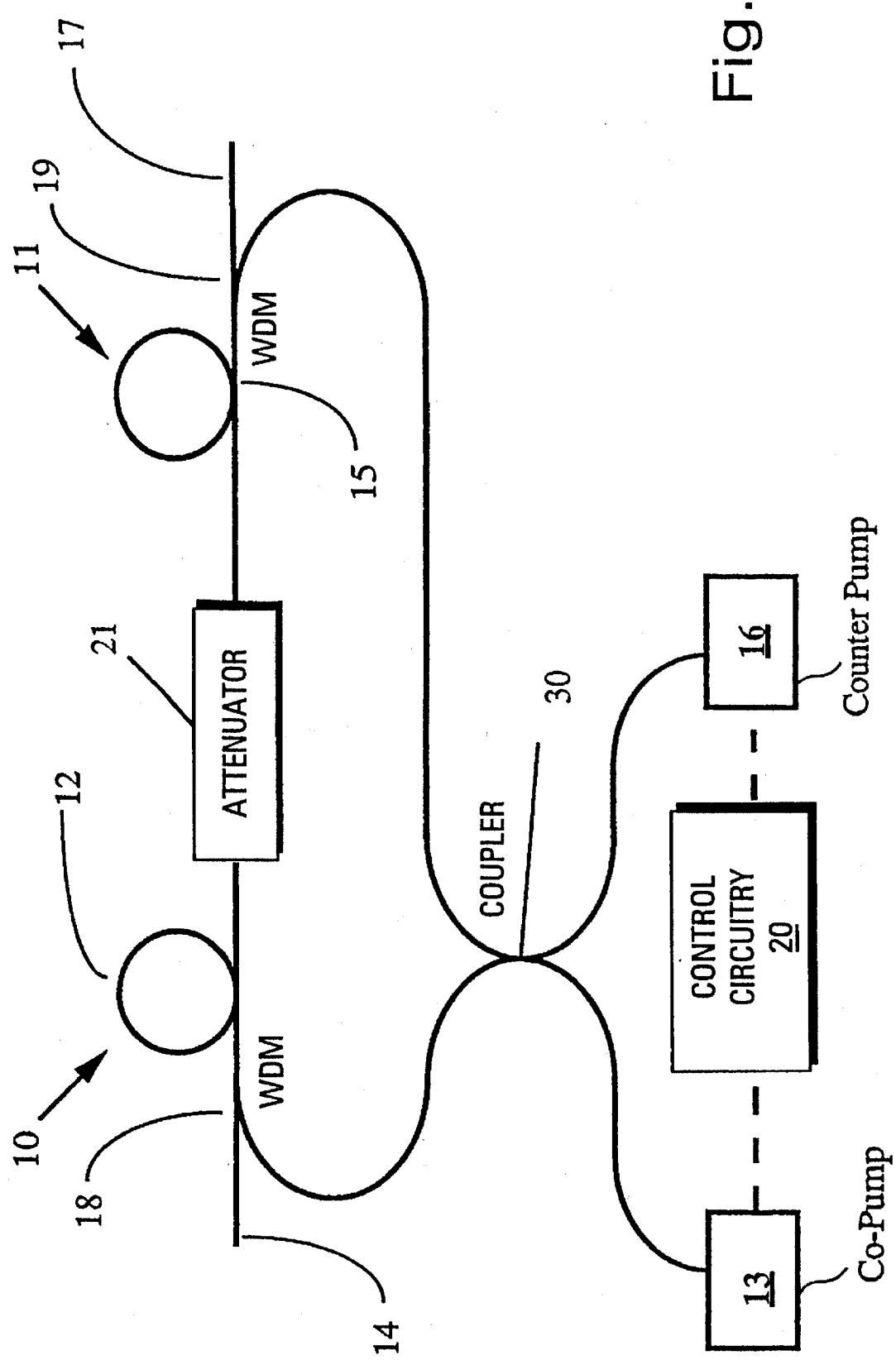
FIG. 2 is a diagrammatic illustration of a modified version.

FIG. 2 is a modification of FIG. 1 which is intended to provide a better default configuration should one of the two pumps 13 and 16 fail. It is emphasised that both pumps 13 and 16 are necessary for optimal normal operation because the two pumps are needed to provide the necessary power. Clearly, if one of the pumps fails, the normal operations will be substantially degraded but it may be desirable to provide a default operation even though the default performance is substantially less than normal performance.

In the modified configuration the two pumps 13 and 16 are connected to a coupler 30 which mixes and splits the output to the two pumps. This produces two different pump outputs but each of the two outputs obtains half its energy from each of the pumps. Apart from this modification the configuration illustrated in FIG. 2 is the same as FIG. 1 and the same technical considerations apply. However the following differences need to be emphasised. In the configuration shown in FIG. 1 if either of the pumps 13 or 16 fail one of the stages 10 or 11 will be without any pump power whatsoever (the attenuator 21 will ensure this). This means that one of the stages will be un-stimulated and in the absence of stimulation it may provide such high degrees of attenuation that not even a default operation is possible.

In the alternative configuration illustrated in FIG. 2 each of the pumps 13 and 16 provides half the energy to operate one of the stages. Therefore, if one of the pumps fails, each of the stages will be stimulated but only at half power. Normal operation will probably not be possible but attenuation will be reduced and it will be more convenient for providing a default operation.

We claim:

1. A multi-stage optical amplifier comprising:

a plurality of fibre amplifier stages, each of which includes means for providing pumped radiation into said stage so as to support laser amplification therein, the stages being connected in series for the sequential amplification of optical signals provided to the first stage, said multi-stage amplifier including an optical attenuator located between each pair of amplifier stages, wherein each attenuator is adapted to attenuate signals at pump wavelength propagated in either direction and also to attenuate signals at signal wavelength propagated in the direction from the output to the input but causing only low attenuation to optical signals at signal wavelength transmitted from the input to the output.

2. A multi-stage optical amplifier comprising:

a plurality of fibre amplifier stages including at least one co-pumped stage and one counter-pumped stage, each of which includes means for providing pumped radiation into said stage so as to support laser amplification therein, the stages being connected in series for the sequential amplification of optical signals provided to the first stage, the multi-stage amplifier including an optical amplifier stages, wherein each attenuator is adapted to attenuate signals at pump wavelength propagated in either direction and also to attenuate signals at signal wavelength propagated in the direction from the output to the input but causing only low attenuation to optical signals at signal wavelength transmitted from the input to the output.

3. An optical amplifier as in claim 1 which includes first and second amplifier stages and two pumps with one attenuator located between the first and second stages.

4. An optical amplifier as in claim 3, wherein:

one of the said two pumps is connected by a wavelength division multiplexer to the input of said first stage, and the other of said two pumps is connected via a wavelength division multiplexer to the output of said second stage.

5. An optical amplifier as in claim 3, wherein:

said two pumps are connected to two inputs of a wavelength division multiplexer having two outputs, one of which is connected to the input of the first amplifier stage and the other of which is connected to the output of the second amplifier stage whereby each of the two stages receives its own pumped energy, said pumped energy being provided half from one pump and half from the other.

6. An optical amplifier as in claim 2, which includes first and second amplifier stages and two pumps with one attenuator located between the first and second stages.

7. An optical amplifier as in claim 2, wherein:

one of the said two pumps is connected by a wavelength division multiplexer to the input of said first stage, and the other of said two pumps is connected via a wavelength division multiplexer to the output of said second stage.

8. An optical amplifier as in claim 2, wherein:

said two pumps are connected to the two inputs of a wavelength division multiplexer having two outputs, one of which is connected to the input of the first amplifier stage and the other of which is connected to the output of the second amplifier stage whereby each of the two stages receives its own pumped energy, said pumped energy being provided half from one pump and half from the other.

* * * * *